United States Patent [19]

Nakai et al.

[11] 4,435,057
[45] Mar. 6, 1984

[54] EXPOSURE CONTROL DEVICE FOR CAMERAS

[75] Inventors: Masaaki Nakai, Osaka; Masayoshi Sahara, Sennan, both of Japan

[73] Assignee: Minolta Camera Kabushiki Kaisha, Osaka, Japan

[21] Appl. No.: 395,079

[22] PCT Filed: Oct. 9, 1981

[86] PCT No.: PCT/JP81/00275
§ 371 Date: Jun. 14, 1982
§ 102(e) Date: Jun. 14, 1982

[87] PCT Pub. No.: WO82/01424
PCT Pub. Date: Apr. 29, 1982

[30] Foreign Application Priority Data

Oct. 13, 1980 [JP] Japan .................................. 55-142565

[51] Int. Cl.³ .............................................. G03B 7/083
[52] U.S. Cl. ..................................... 354/426; 354/458
[58] Field of Search ...................................... 354/24, 51

[56] References Cited

U.S. PATENT DOCUMENTS 4,325,615  4/1982  Yamada ........................... 354/51 X

*Primary Examiner*—Michael L. Gellner
*Attorney, Agent, or Firm*—Watson, Cole, Grindle & Watson

[57] ABSTRACT

A camera capable of AE-lock photography wherein an output of a light measuring circuit is stored in response to a manual operation at an arbitrary time prior to a shutter release operation, and exposure is controlled in accordance with the stored output. AE-lock switch is interposed between a light measuring circuit and a first storage capacitor, while a buffer circuit is interposed between the first storage capacitor and a second storage capacitor. Exposure is controlled in accordance with the charged voltage of the second storage capacitor. The above mentioned buffer circuit is connected with a switch means which supplies power for a given short period at an initial stage in conjunction with a shutter release operation whereby the second storage capacitor is charged to the voltage of the first storage capacitor during that given period.

5 Claims, 3 Drawing Figures

EXPOSURE CONTROL DEVICE FOR CAMERAS

BACKGROUND OF THE INVENTION

The present invention relates to an exposure control device for a camera, and more particularly it pertains to an exposure control device of a storage type wherein an output of a light measuring circuit, which measures the brightness of an object or scene to be photographed, is stored in a capacitor prior to a film exposure and the exposure is controlled in accordance with the stored output.

BACKGROUND OF THE INVENTION

In the storage type camera exposure control device, a storage capacitor stores an output of the light measuring circuit, or an exposure control signal which is obtained as a function of the output of the light measuring circuit and a signal commensurate with a set exposure parameter value. The exposure control signal may be the one for presenting an exposure time suitable for a measured object brightness, a set film sensitivity value and a set diaphragm aperture value, or otherwise may be the one for presenting an diaphragm aperture suitable for an object brightness, a set film sensitivity value and a set exposure time value. Further, the exposure control signal may be the one for presenting a combination of an exposure time and a diaphragm aperture relying on an object brightness and a set film sensitivity value. It should be noted that, throughout this specification, the term "an output of a light measuring circuit" or "a light measurement signal" should be understood or interpretated, unless specified otherwise, as including the exposure control signals having the forms mentioned above, since the exposure control signals are dependent on an output of the light measuring circuit.

In the storage type camera exposure control, the light measurement signal is, in general, stored automatically in conjunction with a camera release operation. An exposure control device is known wherein a light measurement signal is stored in response to a manual operation that is independent of the camera release operation, to enable exposure control in accordance with a light measurement for an area of a photographic scene different from the area which is aimed at by the light measuring means of the camera at a picture taking position. With such a manual storage means, for example, when it is desired that exposure is controlled in accordance with a light measurement for a small area in the scene to be photographed, the camera user may approach the desired area of the scene, have the camera measure the brightness of the area, make the manual operation for the storage, return back to his or her picture taking position maintaining the stored light measurement, and take a picture with a desired framing. The manual storage is also effective in the case when it is desired that a proper exposure is obtained for a corner of the scene with a camera having a light measuring system designed to measure the small central area of the scene. Such photography with the manual storage is often referred to as AE-lock photography since a light measurement signal or an exposure control signal is fixed previously.

Prior art exposure control circuitry capable of such AE-lock photography has a construction, for example, as shown in FIG. 1. Light measuring circuit LMC produces a logarithmically compressed exposure time control signal through an exposure calculation wherein a function of a set film sensitivity value and a set diaphragm aperture value is applied to the value of an output proportional to the logarithm of the object brightness being measured. The exposure time control signal is applied to storage capacitor C. Upon AE-lock photography, light measurement is effected with the camera being directed to a particular area of the scene to be photographed, the output of the light measuring circuit is stored in storage capacitor C and AE-lock switch S is opened by manual operation to fix the voltage of storage capacitor C. When the shutter is released, a switch S short-circuiting timer capacitor C' is opened with switch S' in the emitter circuit of logarithm expansion transistor Tr being closed, so that through the collector of transistor Tr flows a current corresponding to an anti-logarithm of a logarithmic expansion of the charged voltage in storage capacitor C, and timer capacitor C' is charged with the current. When capacitor C' is charged to a given level, switching circuit SC inverts its output to close the shutter through electromagnet Mg.

With the above-described circuit, while transistor Tr is conductive, the electric charge in storage capacitor C is discharged through the base of transistor Tr. Hence, the initial stored value changes when several pictures are taken based on a single storage of the measured brightness value.

SUMMARY OF THE INVENTION

An object of the present invention is to provide an exposure control device which enables a plurality of AE-lock photographs based on a value given by a single time storage, without changing of the stored value.

As described in detail hereinafter, according to the present invention, two storage capacitors are provided such that the first storage capacitor is charged with and stores the output voltage of the light measuring circuit through an AE-lock switch while the second capacitor is supplied and charged with the charged voltage of the first capacitor through a buffer circuit which is adapted to be actuated in response to a shutter release operation for an extremely short time at the initial stage of the operation. The voltage of the second storage capacitor is used for the actual exposure control. Thus, even if several pictures are taken by the AE-lock photography in accordance with the light measurement once entrapped in the first capacitor, the stored light measurement is maintained without any change during the photography, whereby constant exposure will be obtained to the last of the pictures.

According to an embodiment of the present invention, a power switch for the buffer circuit between the first and second capacitors is adapted to be momentarily closed in conjunction with a shutter release operation and to serve also as the storage switch for normal photography.

PREFERRED EMBODIMENT OF THE INVENTION

Figure 1:
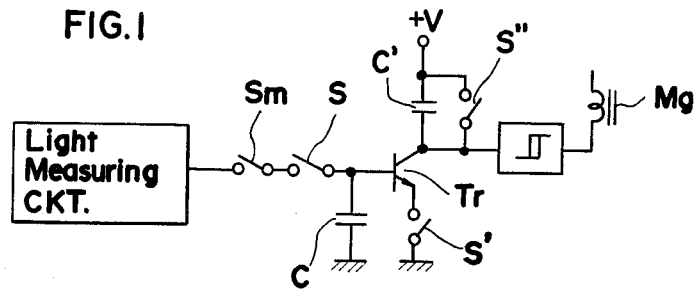
FIG. 1 is a schematic illustration of a prior art device.
Figure 2:
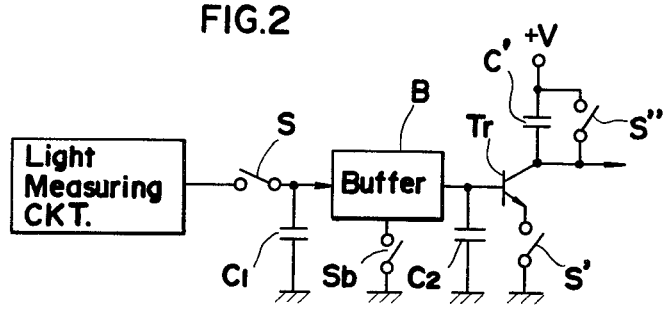
FIG. 2 is a schematic circuit diagram showing the operating principle of the present invention.

FIG. 2 is a schematic circuit diagram for explaining the storage of a light measurement according to the present invention. A light measuring circuit LMC has the same construction and operation as that of the circuit of FIG. 1 and produces at its output terminal a voltage corresponding to a suitable exposure time for a light measurement. The light measuring circuit LMC is connected to first storage capacitor C1 through AE-lock switch S which is manually opened and closed at an arbitrary time. To this first storage capacitor C1 is connected second storage circuit capacitor C2 through buffer circuit B. The charged voltage of second storage capacitor C2 is applied to the base of logarithmic expansion transistor Tr. B denotes a buffer circuit whose power switch Sb is normally open. Buffer circuit B serves to convert its voltage input to a current having a desired magnitude and presenting the same level voltage, and its input and output impedances are significantly high when power switch Sb is open. Construction of the circuit associated with transistor Tr is the same as that of the circuit of FIG. 1 and its elements are denoted by the same reference characters. When AE-lock photography is effected, AE-lock switch S is opened after the light measurement signal is stored in first storage capacitor C1. Then, when shutter release operation is performed, power switch Sb of the buffer circuit is closed for a short time during which the second storage capacitor is charged to the same voltage as that of the first capacitor. Then, the shutter is released with count switch S″ being opened while trigger switch S′ is closed, whereby an exposure control operation is effected. With this construction, as the input impedance of buffer circuit B seen from first storage capacitor C1 is extremely high except for the very short time during which power switch Sb is closed, the electric charge charged in the first storage capacitor C2 is not lost substantially and the second capacitor C2, even if it loses a portion of its charge for each photograph, is recharged by the output of buffer circuit B in advance of the next exposure and refreshed to restore the level of its initial stored light measurement signal, thereby enabling AE-lock photography of multipul pictures in accordance with the same stored light measured value.

Figure 3:
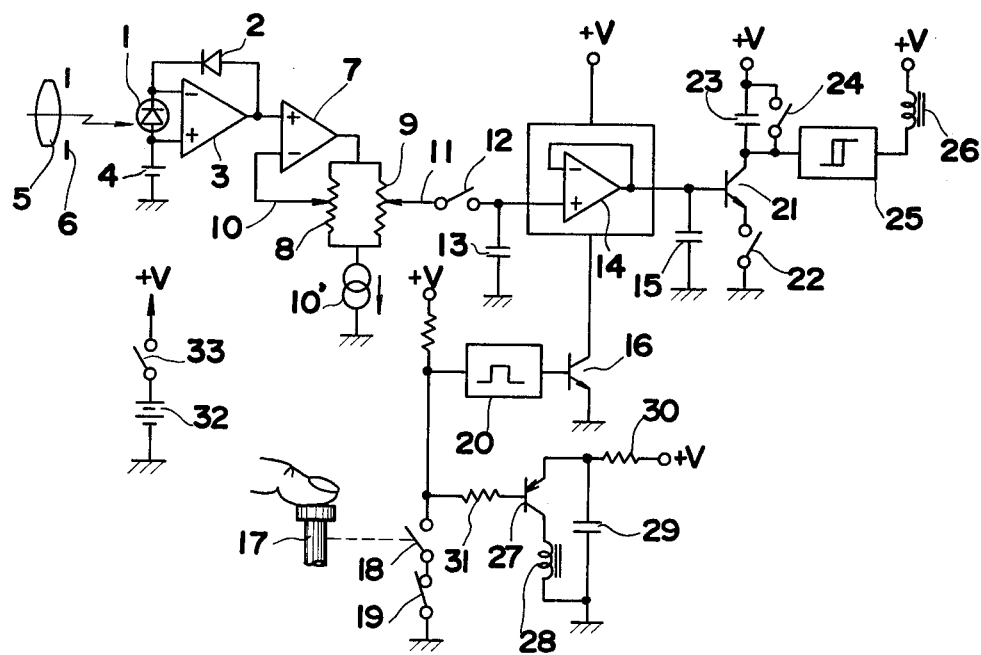
FIG. 3 is a circuit diagram of an embodiment of the present invention.

FIG. 3 shows an exposure control circuit according to an embodiment of the present invention. In this embodiment, the present invention is applied to a single lens reflex camera which effects diaphragm aperture priority automatic exposure time control in accordance with a TTL light measurement which is obtained by measuring an object or scene brightness through the camera objective and the diaphragm aperture. In this embodiment the following correspondence obtains for the cited elements, switch 12 corresponds to the AE lock switch, capacitor 13 to the first storage capacitor, capacitor 15 to the second storage capacitor, and operational amplifier 14 to buffer circuit B shown in FIG. 2. Transistor 16 corresponds to power switch Sb of the buffer circuit in FIG. 2. When one-shot circuit 20 is triggered in response to a shutter release operation, its output pulse makes transistor 16 conductive to supply electric power to operational amplifier. Photodiode 1 is disposed to receive the light coming from an object to be photographed, through camera objective 5 and the aperture of diaphragm 6. The output current of photodiode 1 is converted to a logarithmically compressed voltage signal by operational amplifier 3 having a negative feedback circuit in which diode 2 is connected. The voltage signal is applied to operational amplifier 7 which in turn serves as a buffer circuit being interposed between operational amplifier 3 and a calculation circuit which associates information of the film sensitivity and the diaphragm aperture with the voltage signal. The calculation circuit is composed of potentiometers 8 and 9 and constant current source 10′. Slider 10 of potentiometer 8 is set to a position relative to a film sensitivity while slider 11 of potentiometer 9 is set to a position relative to a step difference between a preset set diaphragm aperture value and the full or maximum aperture value (i.e. minimum f number) of lens 5, whereby at the terminal of slider 11 is produced a light measurement signal as a result of photographic calculation with the object brightness, the film sensitivity and the preset diaphragm aperture value.

AE-lock switch 12 is interposed between slider terminal 11 and first storage capacitor 13 and is opened and closed by manual operation from the outside of the camera at any desired time. Operational amplifier 14 is used as a buffer circuit and its output is connected with second storage capacitor 15. Buffer circuit 14 is suppled with operating current through transistor 16 which serves as a switch. Transistor 16 is made conductive by the high voltage output which is produced, for example, for five milliseconds by one-shot circuit 20 in response to the closure of switch 18 which in turn is caused by depression of shutter button 17 for effecting photography. It is to be understood that switch 19 is opened in response to opening of the shutter and is closed upon completion of film wind-up. Buffer circuit 14 functions as a buffer circuit only while transistor 16 is conductive and is essentially an open circuit between the first and second storage capacitors with its input and output impedances being substantially infinity when transistor 16 is non-conductive.

Transistor 21, having its base connected to second storage capacitor 15, serves as a logarithmic expansion transistor and produces collector current proportional to the anti-logarithm of the voltage of second storage capacitor 15 when switch 22 is closed in response to the opening operation of the shutter. This collector current is charged by integration capacitor 23. When the charged voltage reaches a given value, the output of switching circuit 25 inverts from a low to a high level to deenergize electromagnet 26, thereby closing the shutter (not shown). It is to be understood that switch 24 is adapted for discharging capacitor 23 and is operable in synchronization with switch 22 such that switch 24 is open with switch 22 being closed. Electromagnet 28 connected in series with transistor 27 is adapted for an electromagnetic releasing operation. When switch 18 is closed, transistor 27 conducts to discharge the electric charge in capacitor 29 that has been charged through resistor 30 in advance. By this discharge, electromagnet 28 initiates camera release operation.

The camera user may, at first, direct the camera to a desired portion of a scene to be photographed, observing a view-finder image, and open AE lock switch 12 for AE-lock photography. It is to be noted that, at that time, power switch 33 has been closed by a manual operation and the light measuring circuit and its related circuits are in a power supplied condition. Before switch 18 is closed, second storage capacitor 15 is not fed with the voltage of first storage capacitor 13 and the light measurement output voltage for the preceding photography remains therein. When the user, after determining his or her framing, depresses shutter button 17 to close switch 18, one-shot circuit 20 produces a high voltage signal for five milliseconds with electromagnet 28 actuated to release the camera mechanisms to proceed with well-known sequential exposure operations including stopping-down of diaphragm 6 and retraction of the reflex mirror. It is to be noted that, for five milliseconds at the initial stage after switch 18 is closed, diaphragm 6 remains at its full open condition due to the mechanical delay in the mechanisms, and that, during that time, buffer circuit 14 operates to charge second storage capacitor 15 to the voltage equal to that of first storage capacitor 13. When the above mentioned five milliseconds have passed, buffer circuit 14 is deactivated, and then the well-known operations including the stopping-down of diaphragm 6 and swing-up of the mirror (not shown) occur.

Now, assume that pictures are taken successively by the aid of a motor drive device. During this photography, shutter button 17 is kept depressed with switch 18 being kept closed. When an exposure for the first frame picture is completed and the film is wound up to close switch 19, one shot circuit 20 and electromagnet 28 operate to effect exposure simular to that described above. Thereafter, shutter button 17 is kept depressed for repeat photography. During that time, buffer circuit 14 is activated in each photography to refresh second storage capacitor 15 to the charged voltage of first storage capacitor 13. As first storage capacitor 13 is connected with the input circuit of buffer circuit 14 for a relatively short time for each storage refresh operation, the change of the stored voltage is substantially negligible even if the input stage of buffer circuit 14 is composed of a bipolar transistor. It is to be understood that AE-lock switch 12 is arranged to open while it is being depressed, as for example with a push button switch. In the case of normal photography, AE-lock switch 12 is left closed without being operated. Accordingly, when shutter button 17 is depressed to release the shutter, the output of the light measuring circuit at that time is charged to and stored in second storage capacitor 15 by the action of buffer circuit 14. In this case, buffer circuit 14 also performs the function of storage switch Sm (in FIG. 1) of the conventional circuit.

The embodiment described above is concerned with the diaphragm aperture priority automatic exposure time control circuit of the full-open aperture light measurement type. The application of the present invention is not limited to that type of circuit but the invention may be applied to a shutter priority exposure control circuit and a programmed exposure control circuit insofar as they include a capacitor for the storage means.

We claim:

1. An exposure control device for a camera comprising:
    a light measuring circuit for measuring the brightness of an object to be photographed and producing an output signal for the exposure control in accordance with the measured value;
    an AE-lock switch manually operable independently of the camera release operation;
    a first storage capacitor connected through the AE-lock switch to the light measuring circuit;
    a buffer circuit activated for a given period in conjunction with a camera shutter release operation and having high input and output impedances when the buffer circuit is deactivated;
    a second storage capacitor connected through the buffer circuit to the first storage capacitor; and
    a control circuit for controlling camera exposure in accordance with the charged voltage of the second storage capacitor, said buffer circuit charging the second storage capacitor to a potential equal to that of the first storage capacitor.

2. The exposure control device as set forth in claim 1 wherein said light measuring circuit includes a logarithmic compression circuit which produces an output proportional to the logarithm of the object brightness, and said control circuit includes a logarithmic expansion transistor having a base electrode thereof connected with the second storage capacitor and adapted to produce an output current proportional to the antilogarithm of the signal input to said base electrode, an integration capacitor which is charged with the output current, and a shutter closing means responsive to the charged voltage of the integration capacitor.

3. The exposure control device as set forth in claim 1 further comprising a switch means for supplying power to activate the buffer circuit for a given short period.

4. The exposure control circuit as set forth in claim 3 wherein the switch means includes a switch member operated in response to the depression of the camera release button, a one-shot circuit for generating an output for the given short period in response to the operation of the switch member, and a transistor for supplying power to the buffer circuit in response to the output of the one-shot circuit.

5. The exposure control device as set forth in claim 4 wherein said switch means includes a second switch member opened in response to the opening operation of the camera shutter and closed in conjunction with a film wind-up operation.

* * * * *